Feb. 2, 1943.  C. E. PALMER  2,309,916
AGITATING MEANS AND METHOD FOR FILTER BEDS
Filed Sept. 12, 1938  3 Sheets-Sheet 1

INVENTOR.
CHARLES EDWARD PALMER
BY W. G. Sullivan
ATTORNEY.

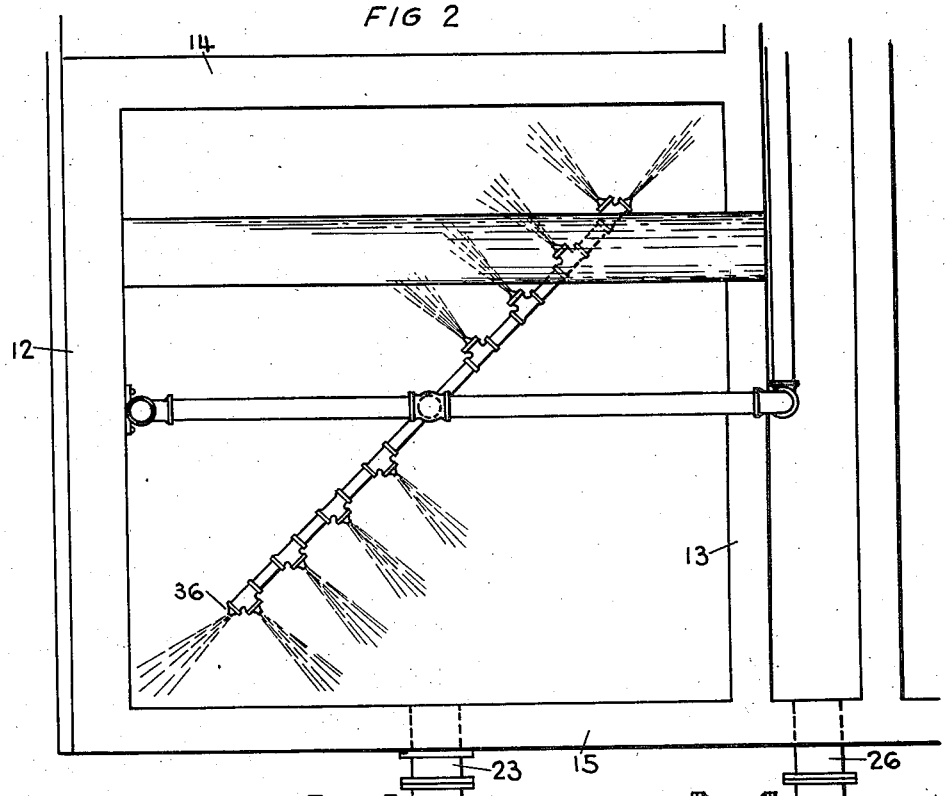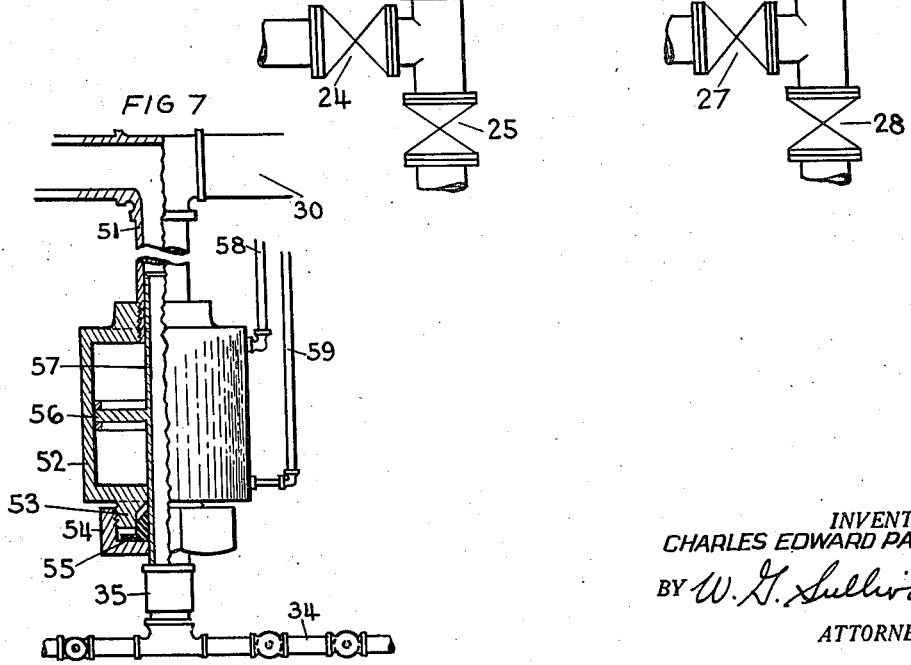

Feb. 2, 1943. C. E. PALMER 2,309,916
AGITATING MEANS AND METHOD FOR FILTER BEDS
Filed Sept. 12, 1938 3 Sheets-Sheet 3
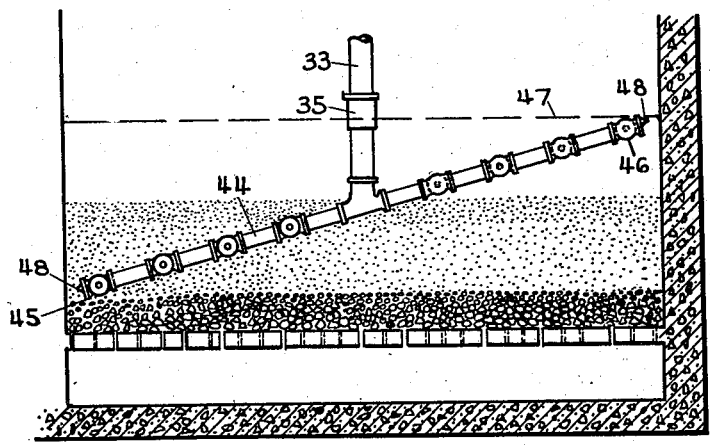
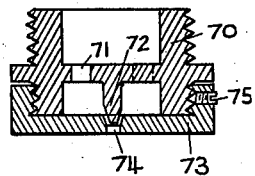
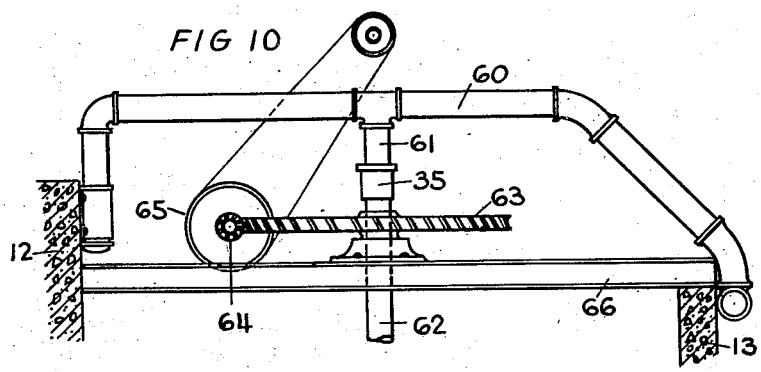
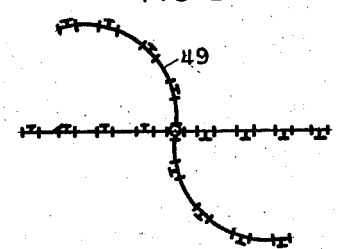
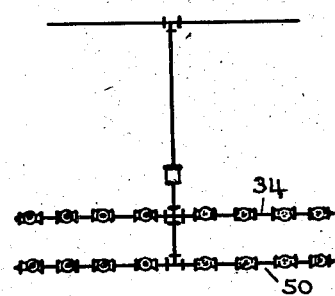
INVENTOR.
CHARLES EDWARD PALMER
BY W. G. Sullivan
ATTORNEY.

Patented Feb. 2, 1943

2,309,916

UNITED STATES PATENT OFFICE 2,309,916

AGITATING MEANS AND METHOD FOR FILTER BEDS

Charles Edward Palmer, Erie, Pa.

Application September 12, 1938, Serial No. 229,431

5 Claims. (Cl. 210—129)

This invention relates to filter beds employed for cleaning and purifying water, and more particularly to an improved means and method for cleaning the filter medium of such beds.

Filter beds for treating water commonly consist of an upwardly open generally boxed shape unit having the base and walls formed of concrete or similar material. A false bottom may be disposed above the base supporting a layer of filtering material such as stone particles of a desired depth and the particles preferably decreasing in size upwardly from the false bottom. Superposed on the layer of stone particles is a layer of sand or similar material of a suitable depth and which effects the cleansing action on water passing through the bed.

Water to be treated enters the unit above the sand or the like and filters through the filtering material and is drawn off adjacent the base and may be further treated if desired. The manner of constructing the bed and of delivering water thereto and therefrom constitutes no essential part of my invention and any desired construction may be used.

As is well known the sand or the like becomes clogged in a short period, dependent upon the condition of the water passing through the bed, due to dirt and foreign matter adhering to the sand particles and filling the space between the particles. This necessitates frequent cleaning of the beds which is accomplished in various ways such as scraping the top surface of sand from the bed or reversing the flow of water through the bed to force water upwardly through the sand and commonly termed "backwashing."

Scraping the top surface of the bed is objectionable in that piping and the like placed above the bed must be removed or designed to permit movement of the scraping means. The scraping means is relatively expensive and considerable time is required for the scraping operation, and the removed sand must be replaced at frequent intervals. Further, scraping at the top surface does not cleanse the sand beneath such surface and for this reason the entire filtering material must be frequently removed and washed before replacing which is not only expensive but prevents use of the bed during this period.

Due to the above mentioned disadvantages the "backwashing" method is commonly employed wherein water is fed under pressure to the base of the bed and upwardly through the sand to effect a washing action through floating the sand and drawing the water off by means of a trough or troughs at a predetermined height above the normal position of the sand. However, a considerable amount of filtering material is washed into the troughs of the unit and insufficient turbulence or agitation is created to cause the particles of filtering medium suspended in the water to be properly cleaned by contact with each other. It has heretofore been proposed to effect agitation by directing jets of water from stationary orifices into the sand while in a fluid state. However, a considerable number of orifices are required to cover the bed area which considerably reduces the jet velocity. Although this improved the washing effect I found that it was still necessary to remove the entire bed for cleaning at relatively frequent intervals and that a considerable volume of "backwash" water must be forced through the beds for washing the sand or other filter medium.

Increasing the backwash pressure or velocity in prior systems with which I am familiar has definite limitations from a cleaning viewpoint. In other words, as the velocity or rise is increased to expand the filtering medium, the filter medium particles are contained in a greater volume of liquid and their attrition effect or abrasive action on each other is correspondingly reduced. This not only increases in a substantial amount the volume of backwash water used but a point is quickly reached wherein the increased agitation effect credited to the rise is neutralized by the diminishing cleansing or abrasive effect of filtering medium particles on each other due to relatively greater space separation of the particles.

I have devised a method and apparatus for substantially increasing the agitation of the suspended sand particles during the "backwash" operation which has correspondingly increased the cleansing effect on the sand particles and at the same time has materially reduced the volume of "backwash" water used.

I employ a rotating arm which is placed in operation after the sand has been placed in a fluid condition by the flooding action of the "backwash" water, the arm being provided with jets or orifices angularly disposed relative to the arm and adapted to cause the water and suspended sand particles to move in a generally rotary path in addition to causing individual eddies resulting in all surfaces of the individual grains of sand being cleaned through contact with other grains of sand.

The velocity of "backwash" water is increased after the rotary arm is in operation which is effected when the sand is in a semi-fluid condition and any tendency toward upsetting the beds is avoided. Upsetting of the beds is caused by the "backwash" water being retarded by the clogged sand and breaking through at a weak point with considerable force resulting in a generally coned shape undermining and an intermingling of sand and gravel.

Filtering medium particles having a lighter specific gravity than sand may advantageously be employed in my system due to the fact that I decrease the commonly employed backwash velocity and rely on the high velocity issuing from the jets for the agitating effect.

It is well known that a filtering medium relatively lighter than sand may have an equally effective cleansing action and will at least accomplish the same bacterial reduction as sand and will under given conditions filter more water in a given period of time than sand resulting in an increased capacity for a given filter area. However, due to the cleansing effect normally required a velocity of backwash must be obtained which causes the relatively lighter filtering medium to rise above the normal level of sand during a backwash operation.

The filter bed expansion during a backwash operation will be substantially doubled for the same cleansing effect for a lighter filtering medium due to the fact that filtering medium now known to be more effective than sand has approximately half the specific gravity of sand.

Due to the increased weight of sand or lighter filtering medium particles when encased with foreign material including mud they tend to sink below the effective zone of the cleansing action adjacent the top surface of the filtering bed. Mud in contrast to sand has an adhesive action which tends to form balls containing a plurality of mud encased sand particles forming a mass of a weight resistant to the breaking action of the backwash. I employ rotating jets of high velocity which effectively break up these balls permitting the mud and foreign material encasing the sand particles to be removed.

It is a primary object of my invention to provide improved agitating means for increasing the cleansing action on the filtering medium when backwashing a filter bed.

Another object of my invention is to provide a substantially increased cleansing action on the filtering medium during a backwashing operation while materially reducing the amount of "backwash" water used.

Another object of my invention is to provide a simple arrangement for increasing agitation during a "backwash" operation on a filter bed.

Another object of my invention is to provide an agitating means for a filter bed which is relatively inexpensive to manufacture and to install.

Another object of my invention is to provide hydraulically operable agitating means for a filter bed.

Another object of my invention is to provide an improved method for cleaning a filtering medium in a filter bed.

Other objects of my invention and the invention itself will become increasingly apparent from a consideration of the following description of the drawings where:

Fig. 2 is a plan view of the filter bed illustrated in Fig. 1.

Fig. 3 is a view generally similar to Fig. 1 but showing a modified form of agitating means I may employ.

Fig. 4 is a diagrammatic plan view of a modified type of agitating arm I may employ.

Fig. 5 is a view similar to Fig. 4 showing a further modified type of arm I may employ.

Fig. 6 is a diagrammatic elevational view of a further modified type of arm I may employ.

Fig. 7 is a fragmentary elevational view partly in section of a hydraulic arm adjustment I may employ.

Fig. 9 is a sectional view of an adjustable jet nozzle I may use.

Fig. 10 is a fragmentary elevational view showing a motor driven arm I may employ.

Figure 1:
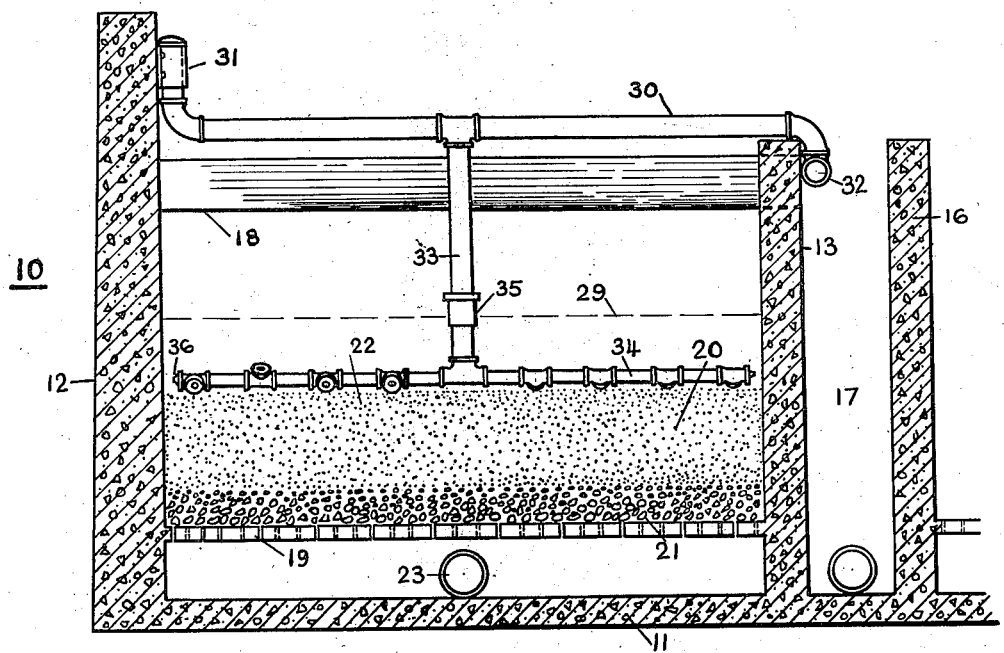
Fig. 1 is a transverse section through a filter bed embodying my invention.

Referring now to the drawings, I have illustrated in Figs. 1 and 2 a filter bed unit generally indicated at 10 and which may be one of a battery of units. The unit is provided with a floor or a base 11, sidewalls 12 and 13, and end walls 14 and 15 formed of suitable material such as concrete. A wall 16 which may be part of another unit forms a flume 17 in conjunction with wall 13 of the unit 10. Extending transversely of the unit 10 is a trough 18 abutting wall 12 at one end and extended through wall 13 at its opposite end to communicate with flume 17.

Spaced upwardly from base 11 is a perforated false bottom 19 which supports the filter material generally indicated at 20. The filter material in accordance with common practice comprises a lower layer of relatively coarse material 21 such as gravel and an upper layer of sand or the like 22. Communicating with the space provided intermediate base 11 and bottom 19 is a pipe 23 which connects with a valve 24 and also a valve 25. In like manner a pipe 26 opening into flume 17 connects with a valve 27 and a valve 28.

In transmitting water to be cleaned to the bed it may be forced through pipe 26 into flume 17 under the control of valve 27, it being understood that valve 28 will be closed. The water will fill flume 17 and flow over the top of wall 13 into the bed aided by trough 18. A portion of the water in flume 17 will flow over wall 16 into the right hand bed as viewed in Fig. 1. The filtered water will collect beneath bottom 19 and pass to a clear well or the like through pipe 23 under control of valve 24, valve 25 being closed.

After the filtering process has continued for a period such as eight to one hundred twenty four hours, dependent on the condition of the water treated, the upper layer of filtering material 22 becomes clogged to the extent that relatively little water is permitted to pass through the bed and it is necessary to discontinue the filtering process and clean the bed. It will thus be apparent that the extent to which the filtering medium is cleaned and the time during which the bed is out of use are important factors in determining the efficiency of a unit and the amount of water handled in a given time.

Backwashing is effected by closing the influent valve 27 and the effluent valve 24 and opening valves 25 and 28. Water will then pass into the bed through pipe 23 causing the layer of filtering medium 22 to become semi-fluid so that the sand particles suspended in water will be carried to a level such as indicated at 29, Fig. 1. As the water continues to rise it will be carried by trough 18 into flume 17 and out through pipe 26 under control of valve 28. This is a common method of backwashing the filter to clean the same but insufficient agitation is effected to provide a thorough cleaning and if a high velocity is attempted to increase the agitation the result is largely carrying filtering medium into the flume. Due to the lack of cleaning effected a considerable amount of backwash water must be passed through the bed before it can be re-used in filtering.

I have provided means to increase the agitation or turbulence comprising a pipe 30 extending transversely of the unit having a closed end 31 and an end 32 communicating with a source of water supply under variably controllable pressure. Pipe 30 may be supported in any suitable manner as by brackets affixed to walls 12 and 13. Disposed substantially centrally of pipe 30 is a downwardly extending vertical pipe 33 rotatably supporting a generally horizontally extending arm 34 by means of a bearing 35 to be later described. Arm 34 is provided with a plurality of spaced T units forming orifices from which jets of water will issue when water is supplied to pipe 30. A sufficient number of the jets are directed laterally of arms 34 to impart a rotary action to arm 34 due to the jets reacting against the fluid sand and water in a well known manner and reacting unbalanced hydraulic forces on each side of the axis of rotation of the arm. The speed at which arm 34 revolves can be controlled by the pressure of water supplied thereto in conjunction with the degree of fluidity of sand. It will be apparent that the rotating jets will cause the semi-fluid sand to be whirled in a generally rotary path in addition to creating individual eddies due to the force of the jets. The ends of arm 34 are preferably provided with orifices 36 directing jets axially of the arm to insure turbulence at the corner portions of the bed, as best illustrated in Fig. 2.

It will be noted that the jets directed both upwardly and downwardly in addition to laterally and that arm 34 is submerged in semi-fluid filtering particles insuring that the filtering particles will be thoroughly agitated at varying depths. Due to the combined whirling path and individual eddies the individual grains of filtering material present all surface areas to other grains so that the grains are thoroughly cleaned of dirt and foreign material which is carried into flume 17. Additionally, the suspended filtering particles are hit by the rotating jets with considerable force so that the particles are subjected both to a scrubbing and washing action. I have found that matter which has a higher specific gravity than the filtering medium in addition to matter of lower specific gravity is carried into the flume 17 without carrying the filtering medium due to the fact that this matter is broken up into smaller particles than the filtering medium by the agitating action.

Figure 8:
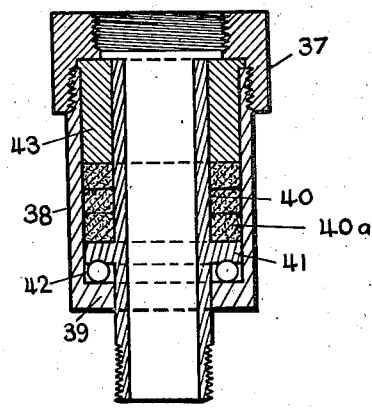
Fig. 8 is a vertical sectional view of a bearing element illustrated in Fig. 1.

Referring now to Fig. 8, I have shown a bearing 35 I may use in connection with the arm of Figs. 1 and 2. A union 37 threaded to pipe 33 is also threaded to a sleeve 38 provided with a flange 39 at its lower end forming one part of a ball race. An inner sleeve 40 is provided with an external flange 41 grooved on its under side to form a second part of the ball race, balls 42 being disposed between flanges 39 and 41. A cylindrical packing gland 43 is locked between union 37, sleeve 38 and sleeve 40 to maintain the upper portion of sleeve 40 in proper alignment and to compress packing indicated at 40a. The lower portion of sleeve 40 is projected from sleeve 38 and threaded to engage a T provided on arm 34 and since arm 34 always rotates in a given direction it will remain securely engaged with sleeve 40. Thus, the arm 34 is rotatably supported in a relatively simple manner and the internal parts of the bearing are protected from the abrasive action of the filtering medium due to the packing and the relatively high internal fluid pressure.

In Fig. 3, I have shown a modified form of arm 44 similar to that of Figs. 1 and 2 but inclined rather than horizontal and adapted to have its lower end 45 extend to adjacent the gravel or lower filter layer and its upper end 46 to adjacent the level to which the fluid sand rises as indicated at 47. In this modification all of the orifices with the exception of the end orifices 48 which direct their jets axially may direct the jets directly laterally or in horizontal planes since the inclination of the arm insures that all parts of the flooded sand layer will be agitated. Although this type arm moves through a greater depth of bed and is relatively longer this is compensated for due to the direct lateral thrust of the jets.

In Fig. 4 I have shown a further modified type of arm 49 of generally S form and which may rotate in a horizontal or inclined plane.

Fig. 5 shows the arms of Fig. 1 or 3 combined with the arm of Fig. 4 to provide a dual arm.

Fig. 6 shows a construction similar to Fig. 1 but wherein a lower additional arm 50 is provided.

Referring now to Fig. 7 I have shown a hydraulically operable arrangement for vertically moving arm 34 or the modified type of arms previously discussed. A pipe 51 secured to pipe 30 threadedly engages the upper end of a cylinder 52, the cylinder at its lower end having an externally threaded collar 53 engaging a gland nut 54 which encases a sealing gasket 55. Sealing gasket 55 encircles a stem 57 of a piston 56, the lower end of stem 57 being secured to element 37 of bearing 35. Pipes 58 and 59 communicate with cylinder 52 on opposite sides of piston 56 whereby differential fluid pressure transmitted through pipes 58 and 59 will effect movement of the piston and the arm secured thereto.

It is understood that any of the arm constructions described may have the arm vertically adjustable manually by any well known construction.

Referring to Fig. 10, I have shown mechanical means for rotating any of the aforementioned arms. The liquid or water supply pipe 60 is preferably elevated as shown and secured to walls 12 and 13 in any suitable manner. Extending from pipe 60 is a short pipe 61 which connects with a bearing 35 previously described. Extending downwardly from bearing 35 is a rotatable pipe 62 which has a perforated arm fixed to its lower end. Fixed to pipe 61 is a worm gear 63 driven by a worm 64, the worm being actuated by a pulley 65. The driving mechanism may be supported on a beam 66 secured to walls 12 and 13. It is understood that suitable driving means may be used other than that shown.

Fig. 9 illustrates a type of orifice means I may use wherein a threaded sleeve 70 may be threaded into a T forming part of arm 34 or the other arms illustrated. Sleeve 70 has a perforated internal flange 71 from which extends a central valve stem 72, the valve stem having a generally frustroconical end. Secured to sleeve 70 is a cap 73 provided with a valve seat 74, the cap 73 being adapted to be locked in an adjusted position by a set screw 75 whereby the fluid passage area between stem 72 and seat 74 may be controlled to regulate the jet velocity.

Although I have shown and described preferred forms of my invention I contemplate that numerous and extensive departures may be made therefrom without departing from the spirit of my invention and the scope of the appended claims.

I claim:

1. The combination with a filter, a filter bed therein comprising loose, granular filter particles adapted to be moved at a predetermined back-wash water pressure, and means for introducing back-wash water at the filter base and directing said water under pressure upwardly through the filter to back wash the same and establish a zone of suspended filter particles and water in the upper portion of the filter, of a vertically extending conduit adapted to receive water under pressure, a bearing disposed adjacent the lower end of said conduit, a horizontally extending hollow arm supported centrally by said conduit and bearing and disposed to rotate in said zone, means for transmitting water under pressure through said bearing to the arm, a plurality of nozzles disposed in spaced relation along said arm, the nozzles at each side of the axis of rotation of the arm extending in opposite directions and substantially at right angles to the arm whereby the arm will be rotated in said zone solely by the reactive force of jets issuing from said nozzles, and nozzles at each end of the arm extending generally longitudinally thereof for directing jets of water longitudinally outwardly of the arm.

2. The combination with a filter bed comprising loose, granular filter particles and having means at the filter bed base for supplying back-wash water under pressure and directing said water upwardly through the filter bed whereby the filter bed is adapted to be back-washed to create a zone of suspended filter particles and water in the upper portion of the filter, of a vertically extending conduit adapted to receive water under pressure, a bearing disposed at the lower end of the conduit, a hollow arm supported centrally by the conduit and bearing in an inclined position, a plurality of nozzles spaced axially along the arm, the nozzles at one side of the arm axis of rotation being directed in a common direction opposite to the direction of the nozzles at the other side of the arm axis of rotation whereby the arm will be rotated solely by the reactive force of jets of water issuing from said nozzles, and nozzles at each end portion of the arm extending generally longitudinally outwardly of the arm whereby jets of water may issue from said end nozzles into an area beyond the area covered by the arm in its rotary movement.

3. The method of cleaning a filter bed of the type having loose, granular filter particles and wherein means are provided for supplying back wash water adjacent the filter base and directing the water upwardly to expand the filter bed and create a zone of water and suspended filter particles in the upper portion of the filter, said method including the steps of supplying back-wash water under pressure to expand the bed and create said zone, concurrently directing water into said zone from another source, introducing the major portion of the water from said other source into the zone in the form of generally parallel jets rotating about a common vertical axis, and introducing the remaining portion of the water from said other source in the form of jets rotating about said common axis and directed angularly of said parallel jets, and said angularly directed jets covering an area in said zone beyond the area covered by the parallel jets.

4. Hydraulically operable agitating apparatus for liquid filters of the type comprising loose, granular filter material forming a filter bed, said apparatus comprising a liquid supply conduit adapted to be supported above the filter bed, a bearing associated with said conduit, a rotatable hollow arm supported generally centrally thereof by said bearing, said arm being adapted to rotate about said conduit as an axis and to receive liquid therefrom through said bearing, a plurality of nozzles spaced along the arm and extending generally at right angles thereto, the nozzles at one side of the axis of rotation of the arm extending in a direction opposite to the direction of nozzles at the other side of said axis whereby the arm will be rotated solely under the influence of jets of liquid issuing from said nozzles, and nozzles extending generally longitudinally from each end portion of the arm adapted to direct jets of liquid longitudinally outwardly of the arm.

5. The method of cleaning a filter bed of the type having loose, granular filter particles and wherein means are provided for supplying back wash water adjacent the filter base and directing the water upwardly to expand the filter bed and create a zone of water and suspended filter particles in the upper portion of the filter, said method including the steps of supplying back-wash water under pressure to expand the bed and create said zone, concurrently directing water into said zone from another source, introducing the major portion of the water from said other source into the zone in the form of generally parallel jets rotating about a common vertical axis, introducing the remaining portion of the water from said other source in the form of jets rotating about said common axis and directed generally at right angles to the parallel jets, and said last named jets initiating at a point beyond the path of the parallel jet most remote from said axis.

CHARLES EDWARD PALMER.